United States Patent
Dayka et al.

(10) Patent No.: US 9,251,337 B2
(45) Date of Patent: *Feb. 2, 2016

(54) SCALABLE, HIGHLY AVAILABLE, DYNAMICALLY RECONFIGURABLE CRYPTOGRAPHIC PROVIDER WITH QUALITY-OF-SERVICE CONTROL BUILT FROM COMMODITY BACKEND PROVIDERS

(75) Inventors: John C. Dayka, New Paltz, NY (US); Michael J. Jordan, Hurley, NY (US); James W. Sweeny, Millbrook, NY (US); Tamas Visegrady, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 229 days.

This patent is subject to a terminal disclaimer.

(21) Appl. No.: 13/095,471

(22) Filed: Apr. 27, 2011

(65) Prior Publication Data
US 2012/0278820 A1   Nov. 1, 2012

(51) Int. Cl.
*G06F 9/46*      (2006.01)
*G06F 21/53*    (2013.01)

(52) U.S. Cl.
CPC .................................. *G06F 21/53* (2013.01)

(58) Field of Classification Search
None
See application file for complete search history.

(56) References Cited

U.S. PATENT DOCUMENTS

| | | | |
|---|---|---|---|
| 5,852,666 A * | 12/1998 | Miller et al. ................... | 713/167 |
| 5,956,725 A * | 9/1999 | Burroughs et al. ................ | 1/1 |
| 5,995,625 A * | 11/1999 | Sudia et al. ..................... | 705/51 |
| 6,135,646 A * | 10/2000 | Kahn et al. ..................... | 709/217 |
| 6,335,972 B1 * | 1/2002 | Chandersekaran et al. .. | 380/286 |
| 6,412,069 B1 * | 6/2002 | Kavsan ........................... | 713/164 |
| 6,484,259 B1 * | 11/2002 | Barlow ........................... | 713/159 |
| 6,490,679 B1 * | 12/2002 | Tumblin et al. .............. | 713/155 |
| 6,496,928 B1 * | 12/2002 | Deo et al. ....................... | 713/153 |
| 6,732,277 B1 * | 5/2004 | Vandergeest et al. ........... | 726/19 |
| 7,079,648 B2 | 7/2006 | Griffin et al. | |
| 7,162,476 B1 * | 1/2007 | Belair et al. ........................ | 1/1 |
| 7,200,756 B2 | 4/2007 | Griffin et al. | |
| 7,369,657 B2 | 5/2008 | Eldeeb | |
| 7,620,821 B1 | 11/2009 | Grohoski et al. | |
| 7,706,838 B2 | 4/2010 | Atsmon et al. | |
| 2001/0018746 A1 * | 8/2001 | Lin ............................... | 713/201 |
| 2002/0016770 A1 | 2/2002 | Flenley et al. | |
| 2002/0031230 A1 * | 3/2002 | Sweet et al. ................... | 380/278 |
| 2002/0056044 A1 * | 5/2002 | Andersson .................... | 713/189 |
| 2002/0071567 A1 * | 6/2002 | Kurn et al. .................... | 380/286 |
| 2002/0095571 A1 * | 7/2002 | Bradee .......................... | 713/164 |
| 2002/0120842 A1 | 8/2002 | Bragstad et al. | |
| 2002/0152378 A1 * | 10/2002 | Wallace et al. ............... | 713/168 |
| 2003/0021417 A1 * | 1/2003 | Vasic et al. .................... | 380/286 |
| 2003/0023957 A1 * | 1/2003 | Bau et al. ...................... | 717/140 |
| 2003/0111528 A1 * | 6/2003 | Sato et al. ..................... | 235/380 |
| 2003/0154375 A1 | 8/2003 | Yang | |
| 2003/0236987 A1 * | 12/2003 | Griffin et al. ................. | 713/189 |

(Continued)

*Primary Examiner* — Shih-Wei Kraft (74) *Attorney, Agent, or Firm* — Cantor Colburn LLP; William A. Kinnaman, Jr.

(57) ABSTRACT

A system for remapping subsets of host-centric application programming interfaces to commodity service providers includes a processor configured to receive a commodity service providers object, embed the commodity service providers object with a handle, transform the handle into a serialized object readable by a hardware security module, generate a virtualized handle from the transformed handle, select a target hardware security module based on characteristics of the serialized object and map the virtualized handle to the target hardware security module.

6 Claims, 3 Drawing Sheets

(56) References Cited

U.S. PATENT DOCUMENTS

| | | | |
|---|---|---|---|
| 2004/0001595 A1* | 1/2004 | Hopkins et al. | 380/277 |
| 2004/0003246 A1* | 1/2004 | Hopkins et al. | 713/168 |
| 2004/0039924 A1 | 2/2004 | Baldwin et al. | |
| 2004/0039925 A1* | 2/2004 | McMillan et al. | 713/189 |
| 2004/0120525 A1* | 6/2004 | Miskimmin et al. | 380/277 |
| 2005/0039190 A1 | 2/2005 | Rees et al. | 719/316 |
| 2005/0071652 A1* | 3/2005 | de Jong | 713/189 |
| 2005/0102509 A1 | 5/2005 | Fascenda | |
| 2005/0188384 A1* | 8/2005 | Yogaratnam et al. | 719/331 |
| 2006/0015727 A1* | 1/2006 | Birk et al. | 713/171 |
| 2006/0253497 A1* | 11/2006 | Abali et al. | 707/200 |
| 2006/0288232 A1* | 12/2006 | Ho et al. | 713/185 |
| 2007/0234033 A1* | 10/2007 | Bade | 713/150 |
| 2007/0282979 A1* | 12/2007 | Tuel | 709/219 |
| 2008/0130895 A1* | 6/2008 | Jueneman et al. | 380/277 |
| 2009/0204964 A1 | 8/2009 | Foley et al. | |
| 2010/0104101 A1 | 4/2010 | Dickinson et al. | |

* cited by examiner

SCALABLE, HIGHLY AVAILABLE, DYNAMICALLY RECONFIGURABLE CRYPTOGRAPHIC PROVIDER WITH QUALITY-OF-SERVICE CONTROL BUILT FROM COMMODITY BACKEND PROVIDERS

BACKGROUND

The present invention relates to cryptography, and more specifically, to implementation of subsets of enterprise-oriented cryptographic Application Programming Interfaces (APIs) from off-the-shelf, module-centric cryptographic service providers of below-enterprise reliability and commodity APIs Mainframe cryptography follows an unusual provider model by maintaining centralized keystores on the host, relying on proprietary stateless backends. Host APIs reflect this difference, relying on host-opaque keystores and key tokens, externalizing stateless services to callers. Module-centric commodity cryptographic service providers (CSPs) operate in a different model, relying on module-resident secrets and APIs which reflect this worldview.

SUMMARY

Exemplary embodiments include a computer program product for remapping subsets of host-centric application programming interfaces to commodity service providers, the computer program product including a non-transitory computer readable medium having instructions for causing a computer to implement a method, the method including receiving a commodity service providers object, embedding the commodity service providers object with a handle, transforming the handle into a serialized object readable by a hardware security module, generating a virtualized handle from the transformed handle, selecting a target hardware security module based on characteristics of the serialized object and mapping the virtualized handle to the target hardware security module.

Further exemplary embodiments include a system for remapping subsets of host-centric application programming interfaces to commodity service provider, the system including a processor configured to receive a commodity service providers object, embed the commodity service providers object with a handle, transform the handle into a serialized object readable by a hardware security module, generate a virtualized handle from the transformed handle, select a target hardware security module based on characteristics of the serialized object and map the virtualized handle to the target hardware security module.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments include systems and methods that remap relevant subsets of host-centric APIs to commodity CSPs' interfaces, in a way which provides enterprise service-level guarantees, relying on commodity-API features. Conventionally, standard APIs can be restructured to fit enterprise CSPs (with proprietary, but commodity-resembling APIs). In exemplary embodiments, the same functionality can be provided with off-the-shelf module-centric CSPs. Furthermore, the systems and methods described herein enable remapping to commercial, off-the-shelf CSPs to provide similar services, with well-defined exceptions, and minimize the overhead in exemplary usage patterns. In exemplary embodiments, the systems and methods described herein embed handles that are implemented by commodity CSPs (to access) within host-opaque regions. Commercial backends are restructured to act as a distributed cache of a host-resident centralized keystore. The exemplary systems and methods described herein can replace host-centric, stateless API calls with a number of module-native ones, allowing coexistence of existing, enterprise-oriented backends and commodity hardware.

Figure 1:
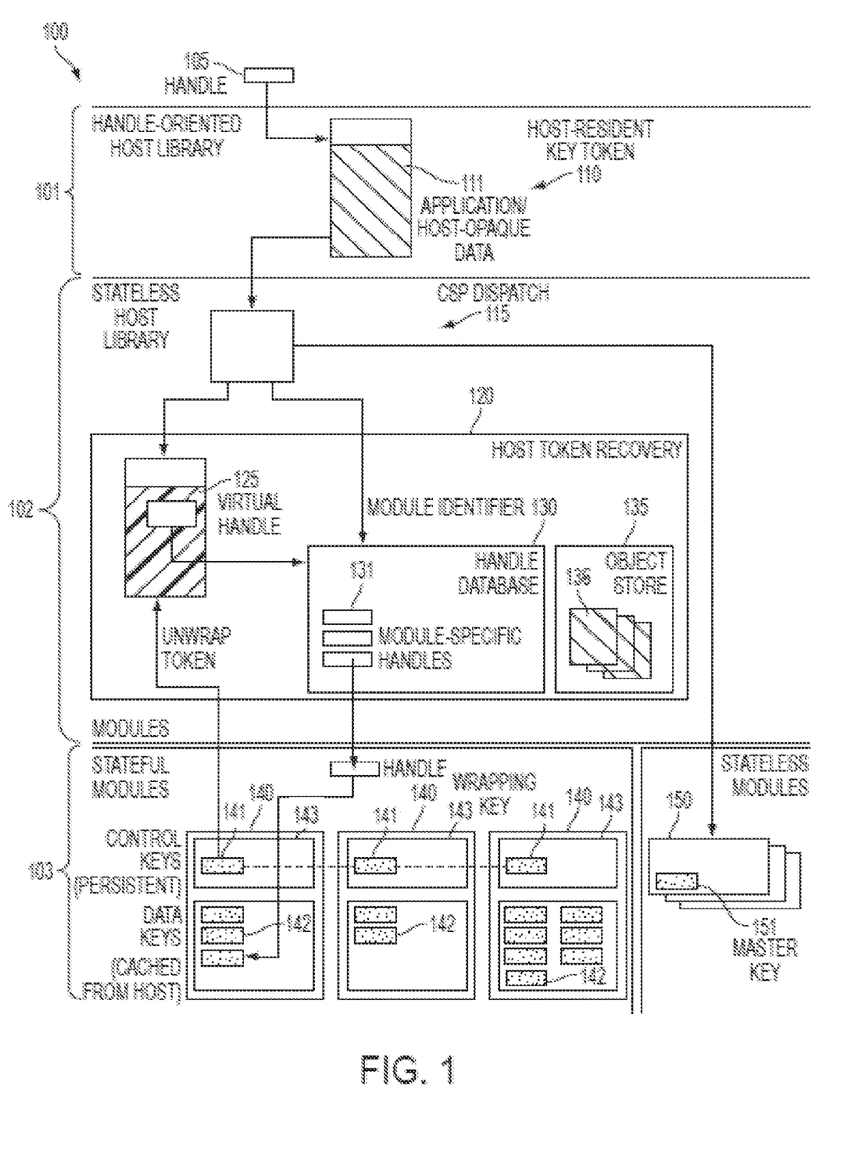
FIG. 1 illustrates an exemplary request data flow illustrating an exemplary method for providing subsets of enterprise-oriented cryptographic APIs from off-the-shelf, module-centric cryptographic providers of below-enterprise reliability and commodity APIs, in accordance with exemplary embodiments.

FIG. 1 illustrates an exemplary request data flow 100 illustrating an exemplary method for providing subsets of enterprise-oriented cryptographic APIs from off-the-shelf, module-centric cryptographic providers of below-enterprise reliability and commodity APIs, in accordance with exemplary embodiments. The flow 100 includes transforming handles 105 into hardware security module (HSM) readable objects in a handle-oriented host library 101, selecting a target HSM in a stateless host library 102 depending on how the handle 105 was transformed, retrieving a virtualized handle 125 in the stateless host library 102, de-serializing the state of the handle 105 in the target HSM that are stateful modules 103, and restoring a stateful backends' serialized state from virtualized handle 125 in a host token recovery 120 in the stateless host library 102. A handle 105 is received by a host-resident key token 110 in the handle-oriented library 101. In exemplary embodiments, the host-resident key token 110 includes application/host-opaque data 111. The transformed handle 105 is then received by the CSP dispatch 115, which dispatches the transformed handle 105 to a virtual handle 125 in the host token recovery 120, as a module identifier to a handle database 130 having module-specific handles 131, and to a stateless module 150 having a master key 151 in the stateful modules 103. In exemplary embodiments, the stateless host library 102 further includes an object store 135 having several objects 136. Within the stateless host library 102, the transformed handle is passed as a virtualized handle 125 to the handle database 130. The handle 105 is then passed to the stateful modules 103 into several modules 140, each module 140 having control keys 141, which are persistent, and data keys 142 cached from a host system. The modules 140 further include a wrapping key 143. As described above, the handle is then passed back to the host token recovery where a serialized state is restored from the virtual handle 125.

Figure 2:
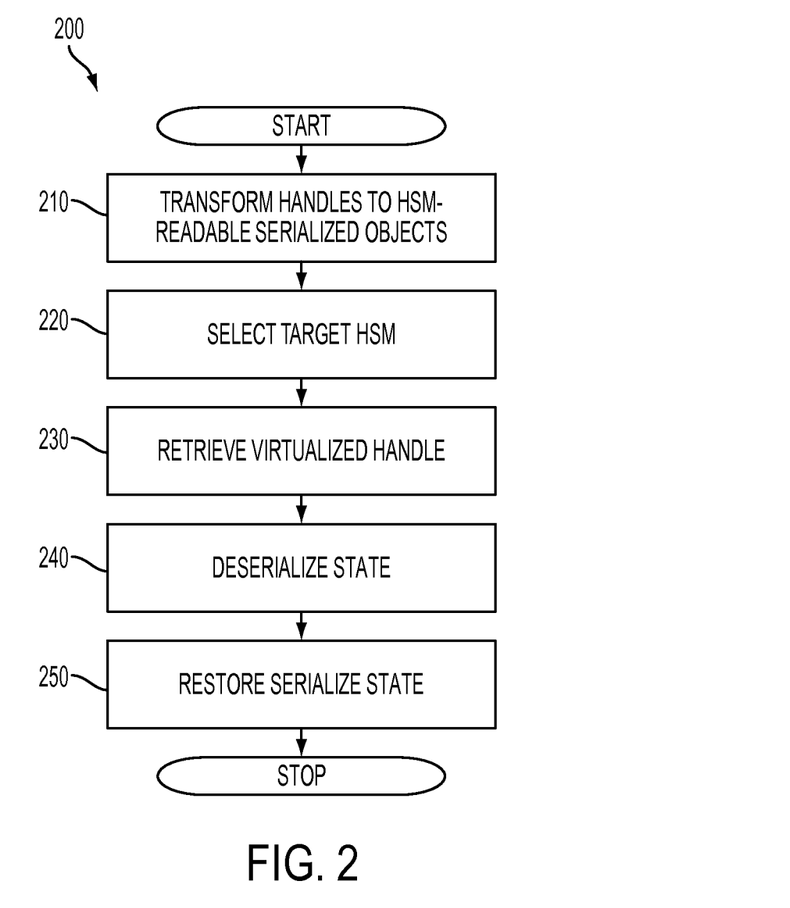
FIG. 2 illustrates a flow chart of method for providing subsets of enterprise-oriented cryptographic APIs from off-the-shelf, module-centric cryptographic providers of below-enterprise reliability and commodity APIs, in accordance with exemplary embodiments.

FIG. 2 illustrates a flow chart of a method for providing subsets of enterprise-oriented cryptographic APIs from off-the-shelf, module-centric cryptographic providers of below-enterprise reliability and commodity APIs, in accordance with exemplary embodiments. The method 200 illustrates the overall exemplary flow as shown in FIG. 1, and is described further herein. At block 210, the method 200 transforms handles 105 into HSM-readable serialized objects in the stateful modules 103. At block 220, the method 200 selects a target HSM based on object characteristics in the stateful modules 103. In exemplary embodiments, block 210 is transparent to other host components, driven by object attributes. At block 230, the method 200 retrieves application-opaque virtualized handle 125 for the simulated-stateless keys as shown in the stateful modules 103. At block 240, the method 200 de-serializes the state and processes request-response flow in stateful backends of the host system. At block 250, the method 200 restores the stateful backends' serialized state from the virtualized handle 125, which takes care of session tracking and similar temporal control.

Exemplary embodiments include a key representation infrastructure for enterprise applications, built on stateful crypto providers ("modules", as shown in the stateful modules 103), which do not meet enterprise requirements. The systems and methods described herein implement commodity backend modules that store keys internally, without redundancy. The object store 135, which is a host-resident, virtualized, scalable object store, is emulated through stateful modules 103. In exemplary embodiments, the systems and methods described herein do not replicate an entire stateful module to another one. Existing commodity providers, which are not generally designed for high-availability computation, do not offer standard methods to clone a module to another one. In addition to lack of cloning, commodity providers with module-resident secrets are inherently not scalable. In exemplary embodiments, the systems and methods described herein store keys in host-resident, encrypted object stores and are rerouted, even if the host-resident object store uses a radically different interface from that of modules. The systems and methods described herein remap states between host-resident ("stateless module") and module-centric (similar to PKCS#11) backends. Optionally, if host-centric, stateless emulations of commodity backends are available (such as such as Enterprise PKCS#11 transforms off-the-shelf PKCS#11 into a statelessness and scalable provider), host functionality may be reduced (compared to cost of implementation on off-the-shelf commodity backends).

In exemplary embodiments, the systems and methods described herein augment a dispatcher to implement API calls of a virtualized, stateless API with stateful, single-instance backends. Cryptographic applications, and emulate stateless APIs that are implemented can include the following properties:

1. Keys and cryptographic sessions are stored encrypted, on a highly-available host. All encrypted tokens are sufficiently large to accommodate entire key material (but not data or session state);
2. The API implements encrypted, "self-contained" objects, maintaining all state on host-opaque encrypted "blobs" on the host. Backends de-serialize objects using transport-wrapping keys (TWKs);
3. Multiple backends' TWKs form a redundant group of essentially disposable modules. Any module is capable of operating on a host-opaque blob, as long as it is loaded with the proper TWK, the TWK corresponding to that of the originating setup;
4. The host API does not generally externalize the number and identity of modules. Host libraries are free to load-balance across an arbitrary number of modules;
5. The system can scale throughput essentially unbounded, as long as one can add modules. Observable throughput is expected to increase linearly for a reasonable number of modules;
6. With a host-resident object store, the aggregate system can support an essentially unbounded number of objects. Specifically, resource restrictions of individual backends are not exposed to the host API. Since backends de-serialize objects, and only need to maintain per-request transient data, backends are lightly utilized, except possibly for temporary storage (during request processing); and
7. Applications must tolerate increased latency, as long as the system provides the desired throughput scalability.

In exemplary embodiments, the systems and methods described herein emulate a comparable highly available, stateless API with commodity, module-centric cryptographic APIs (such as PKCS#11). The stateful module-oriented interfaces differ from host-centric APIs as follows:

1. Modules store a finite amount of objects. Generally, module resource limits are considerably (orders of magnitude) below the size of enterprise object stores;
2. Module-resident objects (keys and sessions) are all referenced indirectly, through handles of moderate size (typically, up to several words but not much larger). Handles, by construction, are much smaller than the keys or state they represent;
3. No convenient or standard facility can quickly clone contents of a module into another one. (Cloning facilities may exist, but they are generally too slow or procedurally inconvenient to perform during servicing regular requests); and
4. Modules with the same interface, but from different models or vendors, may store sessions in incompatible formats. The exemplary methods described herein do not require modules to import or export sessions, and provide session-migration functionality within host libraries.

While sessions are not portable, the modules provide standard interfaces to migrate keys. Both import and export are implemented, and can operate on a mixed set of backends as long as one can generate and export keys. Multiple key sources aid to ensure resiliency and throughput. Commodity APIs expect a module to retain state, and do not provide convenient state migration capabilities, while stateless APIs expect the host to manage all state. As such, in exemplary embodiments, the systems and methods described herein include host libraries that provide equivalent capabilities on top of module-centric management functionality to fully emulate modules with stateless interfaces.

The systems and methods described herein emulate stateless modules, backed with module-centric commodity APIs, and the following fundamental properties are preserved:

1. Keys and related sensitive material in the clear on the host system are not revealed. In case of stateful backends, keys are usually indirect-addressed handles. Handles may be revealed to host (library) code, as handles are, from a module perspective, non-confidential. However, user data is not protected, since data is observable in the clear to layers above the API;
2. The systems and methods described herein accommodate an essentially arbitrary number of simultaneously active key objects, regardless of aggregate resource capacity of all stateful backends. (The number of concurrently utilized key objects can be constrained by aggregate backend capacity);
3. The systems and methods described herein utilize an unbounded number of backends, without fundamental scalability limits;
4. Key information is stored within a fault-resilient host system. In case of backend failures, keys are restored from the host to the backends without service interruption;
5. Requests are rerouted to either stateless or stateful modules without host applications noticing differences between tokens. The system changes only application-opaque data within key tokens. No further (i.e., application-visible) differences between tokens destined for stateless or stateful modules are required. Information about the actual target module may be revealed through variations in latency. Backend-specific latency is not considered confidential;
6. The systems and methods described herein can add or remove backends without notifying applications;
7. The systems and methods described herein do not store a session's (streaming, etc.) state within modules between host API calls. All inter-call data is maintained within the host, exporting and importing through backend APIs when callers request incremental services.

The systems and methods described herein implement "atomic" operations, as long as API-level atomicity is desired. Such composite operations are not necessarily atomic at the module level, but the host library does not expose the internal call sequence. Host applications tolerate increased latency, if emulation on commodity backends requires increasing it.

As described herein, the exemplary systems and methods implement commodity backends, and do not require modifications to module firmware. Module-specific requirements are enumerated in terms of typical module APIs, such as PKCS#11 for stateful crypto devices:
1. Wrapping keys are synchronized between all backends to unwrap key tokens. Wrapping keys are inserted during initialization, and they may be retained within backends indefinitely;
2. A related (symmetric) key allows key migration in and out of stateful modules. These keys are synchronized between backends, and they transport all possible object (key) types. As described herein, only keys are transported, not sessions, between the host and commodity providers (or implicitly, between modules). Therefore, the equivalent of PKCS#11 WrapKey and UnwrapKey services is implemented, but generally no session-transport capabilities are implemented (which standard PKCS#11 does not provide);
3. Confidential objects are stored primarily on the host. Objects within backends are migrated into backends first, with the exception of newly generated objects. In exemplary embodiments, module-resident keystores are implemented only as a cache of objects from the host-resident object store 135. In addition to module requirements, a persistent host-resident mapping is implemented between "virtual handles" (VHs) and actual module handles. Host code can provide such a mapping database, and independent host libraries access a single, shared lookup database.

As shown in FIG. 1, the systems and methods described herein process requests to stateful and stateless modules 103 in a similar fashion, hiding differences within a host-resident library. For stateless modules, host-resident key tokens are passed directly to modules, which are synchronized through a shared Master Key. Key tokens are recovered within each backend, and may be used internally. Recovered keys are generally discarded, after they are removed from the hosting HSM during a cache eviction, or upon servicing a request, and these backends effectively maintain only infrastructure ("control") keys persistently, but store no persistent data keys. In the infrequent case when a token is updated, its host copy is changed as part of the response. Stateful modules address module-resident objects through handles. Due to this indirection, application-opaque keys may contain similar handles and address a host-resident database without host applications recognizing the replacement (as only host libraries, but not applications, can access the wrapping key and therefore inspect opaque regions). Host-resident key tokens with embedded VHs are designated "fake-key tokens" (FKTs) as they are used only indirectly, and do not themselves contain key material.

The host dispatcher processes stateful-module tokens differently than stateless ones:
1. Recognize a stateful-backed token based on host-visible properties (such as wrapping-key identifier);
2. Unwrap the application-opaque region, recovering a VH (virtual handle). The VH is system-unique, but it may map to multiple module-resident handles (one per available backend). Since stateless tokens contain their entire key material in encrypted form, and VHs of modest size are implemented, a virtual handle can be embedded in a token without application-visible changes (which, by construction, can be restricted to size changes of opaque regions). In systems with high-assurance separation between applications and libraries, application-opaque data can be unwrapped with a library-controlled key. If regulatory or standards' requirements do not allow software unwrapping, stateful modules possess the wrapping key, so unwrapping capability scales with module count. VHs are unwrapped, but actual key material from tokens is not unwrapped. Therefore even library-resident keys may decrypt tokens without violating security assumptions;
3. Transform the virtual handle and a destination module identifier (the latter from the dispatcher) to a module-specific handle. The necessary lookup table maps virtual handles to handles unique to each particular module, as in the general case the same object may be addressed through different handles in different stateful modules. If the virtual handle designates an object not present in any stateful module, the object is sent to a module first. Once the object has been unwrapped within a module, it has a module-specific handle and may be further processed;
4. Submit user data to the dispatcher-designated stateful module, using the retrieved handle to designate the key.

As shown in FIG. 1, the host-resident host library 101 includes objects in encrypted form, ready to be imported to stateful backends. Since virtualized, host-resident keystores are infinitely scalable, effective keystore capacity may grow beyond the aggregate of stateful backends. A transport (wrapping) key 143 is maintained within stateful modules 103, and import keys 141, 142 from the host when needed. Since the stateful modules 103 work with module-resident keys 141, 142, 143, algorithms known from cache management (for example) are implemented to optimize the availability of module-resident secrets.

When an object is created, it is generated within the target module and export into the host-resident object store 135. In this case, data does not include a token originated from the host. Once a new object has been created, it is exported into the host object store 135. For subsequent requests, the control/data flow described in FIG. 1 is applicable.

In a typical enterprise environment, for highly available objects, the newly generated module-resident object is migrated into the host object store 135 before indicating success. While this additional step increases key generation latency, it is necessary to insure that any application-visible object exists in multiple copies by the time it becomes application-visible, and therefore it is already highly available/reliable upon key generation. Key generation is usually infrequent, and key generation latency may be high, and the additional latency is insignificant.

In exemplary embodiments, the systems and methods described herein implement a system-unique identifier (i.e., the virtual handle 125) to designate key objects 136. A key handle of modest size (at most tens of bytes) may describe all realistic key-usage scenarios. A hard size limitation is that the encrypted virtual handle fits within the application-opaque regions 111, which contain entire encrypted keys. In exemplary embodiments, the host has a readily available mechanism to assign globally-unique handles to every host-visible key, and even independent host libraries may have access to such a global virtual-handle database. Host code may need further coordination (or centralized assignment) of virtual-handle ranges to guarantee uniqueness. In exemplary embodiments, a database mapping virtual handles and target modules' identifiers to module-specific handles (as the same object may have been imported to different handles into different modules). In exemplary embodiments, the database accommodates any foreseeable increase in the number of modules. In addition, the host removes virtual handle database entries corresponding to modules that have been removed. Since the systems and methods described herein remove state from modules, once an atomic host API call terminates, only session-oriented (incremental) PKCS#11 objects are retained within modules in the long run. Therefore, incremental objects (and their handles) are not represented, and only "stateless" objects (i.e., keys) need to be represented by VHs.

In exemplary embodiments, the systems and methods described herein exploit both reliable and unreliable commodity backends. In exemplary embodiments, backends with commodity interfaces are implemented, but sufficient RAS (reliability, availability, serviceability) to at least report (or preferably, correct) transient errors can also be implemented. Such backends do not need to provide further error checking. In these cases, the system only increases scalability (both in throughput and apparent module resource storage capability) but does not need to add high-reliability. If the system is implemented with backends of insufficient RAS coverage, host library assistance is needed to perform calculations redundantly. In such cases, host libraries need to use reliability-enhancing methods known from, as an example, RAID (redundant DASD) systems.

In exemplary embodiments, the systems and methods described herein have considerable freedom balancing translation between host and module, as long as the host-observable interface is unchanged. If master-key holders of other systems introduce their key into the exemplary module, the other systems' tokens can be transparently mapped to the exemplary system. For legacy users, tokens are remapped once ("re-encipher"), and an updated blob is returned for subsequent use, with a transformed version of the same key material. Regardless of where translation occurs, the exemplary module code interprets legacy key tokens. However, if host code maps user tokens to exemplary tokens transparently, the interpretation of legacy objects can be removed from the request path. In that case, the cost of host lookups reduces the overall request latency, as regular requests' paths only deals with native objects.

The exemplary systems and methods described herein extend the well-known principles of redundant storage, relying on cryptography-specific capabilities to make even stateful translation transparent. The exemplary systems and methods described herein can utilize RAID configurations, and also dynamically reconfigure backends since the remapping layer can transparently modify backends' configuration. The exemplary systems and methods described herein can also be applied to multiple service levels, controlling the number of backends caching particular keys. Since the system can scale the number of backends without limitations, complex service-level hierarchies can be implemented with a sufficient number of modules. Bandwidth management may be managed entirely within the VH-mapping step, and it can be added transparently to all other subsystems. A host dispatcher can implement backend processing to manage keys "offline", not driven by requests. As an example, time not dedicated to application requests can be implemented to populate newly inserted modules with frequently used keys, to improve the expected response time (or preemptively optimize overall throughput when the host library is idle).

In exemplary embodiments, generic requirements may be mapped onto regular PKCS#11 services as now described as an example. Since single-pass operations are typically trivially remapped, on incremental operations are discussed. The exemplary systems and methods described herein can be implemented for incremental, stateless operations, as described herein. As such, details of straightforward, pass-through remapping of single-pass calls are omitted for illustrative purposes.

In exemplary embodiments, host libraries implement two disjoint functionality layers, and their structure reflects this difference. Caller-visible APIs handle session tracking, datastream partitioning and reassembly, and further glue operations necessitated by the mismatch between caller-visible and module APIs. For example, a lower level is added to the system-wide cryptographic service (facility) to handle system-wide operations. Several services are provided including, but not limited to:

1. Assisting the facility with load balancing. Multiple facility instances may not be aware of all module-visible operations, such as module load, while this system-wide layer may have access to more, typically system-aggregate details;
2. Mapping VHs to per-module object handles. This remapping is system-unique, and serves all concurrent facility users. VHs accommodate multiple facility instances, which have allocated all their available handles. Therefore VHs are longer than module handles (i.e., over 32 bits in practical systems); and
3. Managing modules, including failures and planned replacements or additions. This functionality bridges facility and machine-specific operations, and is currently present within the facility. Certain operations, such as dispatching actual PKCS#11 calls or load-balancing, may be performed in both layers. The system-wide level shares code with the facility, with extensions for system-wide operations.

In exemplary embodiments, VHs are system-wide visible and map to a dynamic set of module-specific real handles. The host assigns globally unique VHs to objects, and allows transparent reconfiguration of VH-to-module-handle mappings. If the system contains multiple host API instances, the system assigns VHs uniquely, without conflicts between multiple facility instances, for example. VHs of sufficient size, typically of a few dozen bytes, allow for essentially unbounded object scalability. Since host tokens are emulated with their key material embedded, such VH state is available. In order to enforce VH-to-module handle mappings, cryptographic message authentication codes (MACs) are implemented on the VH areas within FKTs if possible. Unkeyed hashes may be used for the same purpose, if host tokens are so authenticated. Given a host token, the VH reconstruction steps are the following:
1. Recognize FKTs and reroute them to VH reconstruction. Let real host tokens pass to legacy cards;
2. Decrypt the "key material" within the FKT (the unwrapping key is always resident within each module);
3. Verify that the recovered VH area is valid, and it's MAC (or at least digest) is correct;
4. Find (or let the caller specify) a suitable target module to service the call. Knowledge of module-resident objects is implemented to select the target module;
5. If the designated target module does not have a copy of the required key, import the key from the low-level object store (through a PKCS#11 UnwrapKey call); and
6. Return the module designation and the handle which designates the VH's object within the target module. Since the exemplary systems and methods described herein do not require object migration out of modules, module-handle-to-VH reverse mapping may or may not be implemented. In exemplary embodiments, implementations may optimize for a straightforward VH-based hash scheme.

The exemplary systems and methods described herein retain a low-level, host-resident object store as an authoritative source for encrypted key objects. Modules store only a cached subset of the object store, distributed within the backing HSMs. Module-resident objects are caches of host-resident objects, since they are only copies, but may be accessed faster (i.e., need not be imported into the target module before use). The host library manages the aggregate "cache" available in the modules, including cache replacement. Session objects within modules only temporarily, for the duration of any single host call. Once the sequence of PKCS#11 calls is terminated, any state is extracted (in a form that's reusable for further host-incremental calls) and the module-resident version is discarded. Therefore, at a call boundary, modules are essentially stateless (they contain arbitrarily disposable, "read-only" objects) once a call returns to the caller. Caller-visible libraries (such as independent facility instances) may be implemented as layers to manage caching. However, host code implementing the low-level object store and VH-to-handle mappings can observe system-wide usage patterns, and possibly tune cache management to fit the system workload. Newly introduced modules, or newly installed machines, start with "empty" modules (i.e., only wrapping keys, no objects). The backends are populated driven by requests, caching host objects, as soon as they obtain a copy of wrapping keys.

In exemplary embodiments, digest operations can operate on cleartext and can be safely performed on the host. Host code can exploit high-throughput engines, if available. The host does not need to send digest operations to the backend, and does not utilize a commodity backend's lower-throughput digest service. The host library separates digital-signature operations into digesting and actual public-key operation. The initial digest is calculated on the host, delegating only the public-key operation to a backend. For the DigestKey operation, if the host library requires the capability to digest secret keys, intermediate digest structures become sensitive and need to be transported between backends.

In exemplary embodiments, hash-based MAC (HMAC) calculation is implemented on top of digesting and differs from digesting since intermediate states are sensitive. Keeping HMAC sessions on the host between incremental calls is not conventionally possible with off-the-shelf PKCS#11 backends, due to the lack of standard state ex/import mechanisms (i.e., PKCS#11 targets "deep" end-devices, not stateless ones which transfer sensitive state with each call). As such, in exemplary embodiments, single-pass HMAC calls, as with other single-pass operations, are trivially remapped with minimal modifications. As with other calls, the number of possible parameter combinations is limited, most likely served from small, fixed translation tables (e.g., mapping rule arrays to PKCS#11 mechanism structures).

In exemplary embodiments, for secret-key MAC (signatures), off-the-shelf PKCS#11 offers limited support for secure-key MACs. Most of this functionality is broken down to multiple PKCS#11 primitives, or added as custom extensions. In exemplary embodiments, new algorithms as described herein are implemented. However, conventional PKCS#11 objects already support the necessary restrictions to prevent a MAC key from decrypting, for example. Further restrictions, such as removing the capability for certain key sizes or specific algorithm sub-types can be performed at crypto provider level, and therefore does not impact keytypes.

In exemplary embodiments, for public-key operations, public-key services operate on single-pass data, or may be decomposed into incremental and single-pass operations. The incremental calls, if present, all update digests and may be handled in the clear (i.e., as all input would be, by construction, non-sensitive). In exemplary embodiments, the host library performs this separation, and concentrates only on the actual public-key operation. The systems and methods described herein map public-key operations trivially. Signing mechanisms are mapped from the host API to backend, through simple, predefined tables (as the number of choices is limited to a few variations). Module-specific handles are recovered from a host token's VH. Once the corresponding public-key object is mapped into a module-handle, the backend operation is invoked directly, returning. As public-key operations do not modify their own state (the systems and methods described herein send single-pass, terminating calls to these objects), they may be freely discarded from within a module, if object-cache replacement requires this action.

In exemplary embodiments, for symmetric en/decryption, the host API provides core symmetric modes, mainly those based on electronic codebook (ECB) and cipher block chaining (CBC) modes. In such cases, the host library collates input streams, and only delegates full-block incremental calls to modules (i.e., due to restrictions of the PKCS#11 API). Most relevant modes may be built on top of such a streaming implementation.

The systems and methods described herein map each incremental (whole-block) update to a full PKCS#11 encryption/decryption session, and "extract" the final state once this sequence terminates. The systems and methods described herein implement a full cryptInit, crypt and cryptFinal sequence for each incremental update. The host library maintains chaining state between these calls, in addition to any blocking it may have already performed (i.e., chaining is of the same size).

For ECB mode and related calls (such as CTR, which is implemented through ECB), the system does not "chain" between incremental calls. In such cases, the host library generates entire blocks (from its internal object store) and may discard all final states once the operation sequence terminates.

Modes derived from CBC "extract" their chaining state once the corresponding cryptFinal call is issued, and retains it on the host. The system may retain the last ciphertext block, which is the chaining value used by CBC. As this intermediate value may be obtained through calls of the original stateless API, the system does not create new vulnerabilities by exposing the chaining value to host code. In PKCS#11 terms, the host retains the last ciphertext block and supplies it as the IV of the subsequent cryptInit call.

Currently implemented symmetric modes may be built from primitives, if the host is allowed to manipulate the plaintext on the host. If standards or other requirements mandate processing within protected envelopes (which can't be enforced by off-the-shelf PKCS#11), a compatible replacement is added as a custom PKCS#11 mechanism.

Modes which differ from ECB or CBC mainly in padding (e.g., RFC#1423/PKCS padding) may be allowed to be implemented on the host. Security is not impacted if intermediate results are made host-visible, as they would also be obtainable through their underlying modes, therefore not revealing illegal ciphertext that does not actually increase security. For example, while a PKCS-padded CBC mechanism may return a padding-related failure without revealing cleartext, CBC-decrypting the ciphertext reveals the same plaintext (without the padding-related error).

In exemplary embodiments, the backends' PKCS#11 key generation (for both secret keys and public key (PK) keypairs) is extended to handle sufficient redundancy and performs the following:

1. Map the host API key generation request into the equivalent PKCS#11 call and mechanisms;
2. If the designated target module is full, discard objects from it, which can also be performed iteratively, if key generation fails due to lack of module resources;
3. Generate the module-resident key and designate the new object as sensitive and extractable;
4. Return any possible key-generation failures to the caller, if it is caused by user-originated errors, such as bad parameter combinations. In exemplary embodiments, predefined, fixed mappings can be implemented, and key generation requests can be assumed to fail due to user error. Backends do not exhaust their resources. If they do, remove objects from the target module and retry until the resource bottleneck is removed;
5. Export the newly generated object, encrypted by the object wrapping key. Once this extracted version is available in the host object store, the key effectively becomes redundant, and safe to report to the caller;
6. Add the newly generated key to the handle database, assigning a new VH. From this point, the new VH may be "announced" and used;
7. Create a FKT containing the newly created VH within its encrypted key-material section. Encrypt the FKT with the system-global wrapping key; and
8. Return the FKT to the caller. Apart from the reported controlling master key (MK) (through the MK pattern within the token), it is indistinguishable from real host-resident tokens. The key generation sequence enables that user-visible keys are already in highly-available form when the caller receives ownership of their newly created object. Overhead is limited to the export operation, negligible for public-key pairs. All required services are provided by off-the-shelf PKCS#11 calls.

In exemplary embodiments, while host-resident keys are usually not destroyed (within limitations), key objects can be removed from backends. During cache replacement, module-resident keys may need to be removed. This removal purges the module-resident copy, retaining the encrypted copy within the host object store. Since incremental operations to return their state to the host between calls, module-resident objects may be discarded at any time (since they may always be restored from the object store). The exemplary systems and methods described herein implement a simple reference count to special-case objects which are utilized, and remove only ones which are then not used. The host-resident handle database may grow essentially unbounded. As long as hosts may retain a host-resident object, and its controlling MK is reachable, the object is not removed from the host store.

Figure 3:
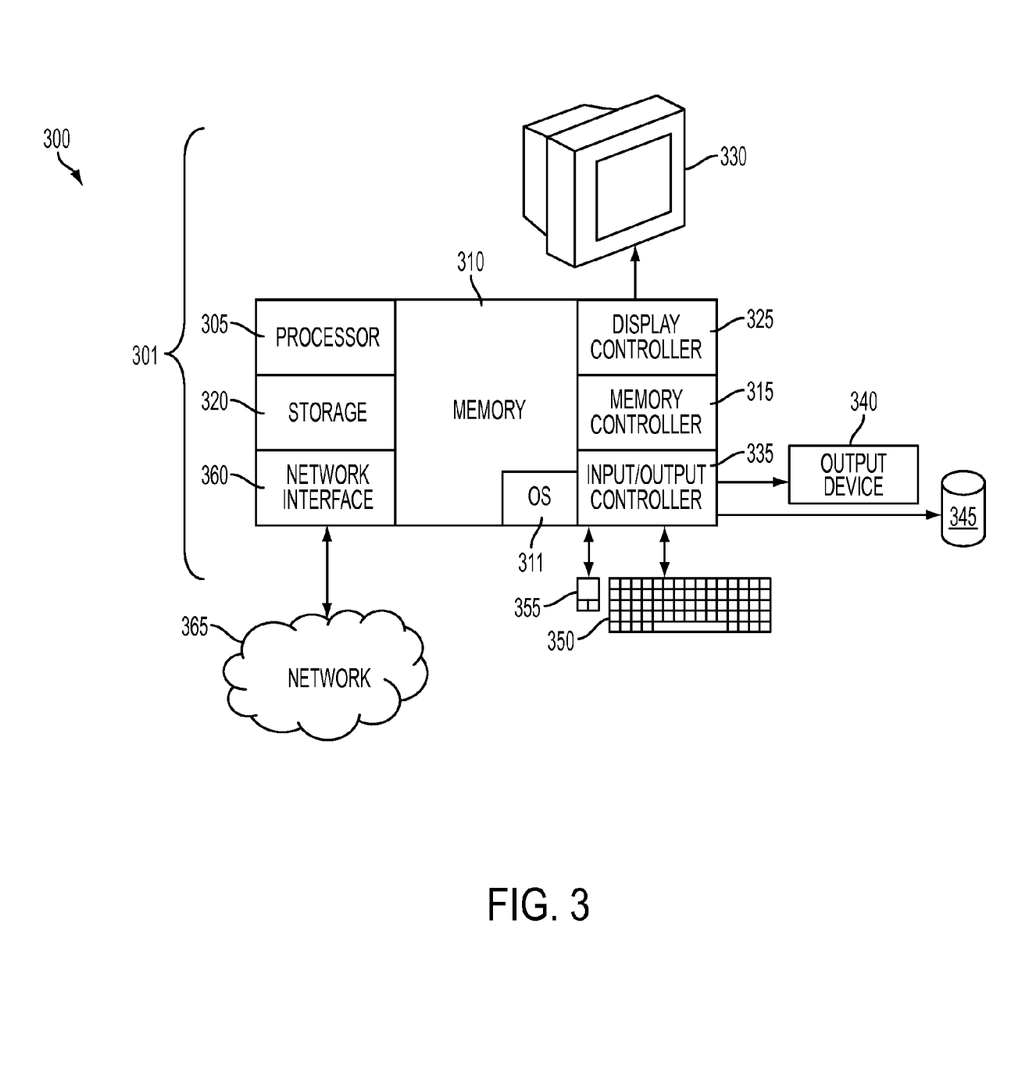
FIG. 3 illustrates an exemplary embodiment of a system for remapping relevant subsets of host-centric APIs to commodity CSPs' interfaces.

The remapping of relevant subsets of host-centric APIs to commodity CSPs' interfaces can be performed in any suitable computing system as now described. FIG. 3 illustrates an exemplary embodiment of a system 300 for remapping relevant subsets of host-centric APIs to commodity CSPs' interfaces. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 300 therefore includes general-purpose computer 301.

In exemplary embodiments, in terms of hardware architecture, as shown in FIG. 3, the computer 301 includes a processor 305, memory 310 coupled to a memory controller 315, and one or more input and/or output (I/O) devices 340, 345 (or peripherals) that are communicatively coupled via a local input/output controller 335. The input/output controller 335 can be, but is not limited to, one or more buses or other wired or wireless connections, as is known in the art. The input/output controller 335 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 305 is a hardware device for executing software, particularly that stored in memory 310. The processor 305 can be any custom made or commercially available processor, a central processing unit (CPU), an auxiliary processor among several processors associated with the computer 301, a semiconductor based microprocessor (in the form of a microchip or chip set), a macroprocessor, or generally any device for executing software instructions.

The memory 310 can include any one or combination of volatile memory elements (e.g., random access memory (RAM, such as dynamic RAM (DRAM), static RAM (SRAM), synchronous DRAM (SDRAM), etc.)) and non-volatile memory elements (e.g., read only memory (ROM), erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, and/or other types of storage media. Note that the memory 310 can have a distributed architecture, where various components are situated remote from one another, but can be accessed by the processor 305.

The software in memory 310 may include one or more separate programs, each of which comprises an ordered listing of executable instructions for implementing logical functions. In the example of FIG. 3, the software in the memory 310 includes the remapping methods described herein in accordance with exemplary embodiments and a suitable operating system (OS) 311. The operating system 311 essentially controls the execution of other computer programs, such the remapping systems and methods as described herein, and provides scheduling, input-output control, file and data management, memory management, and communication control and related services.

The remapping methods described herein may be in the form of a source program, executable program (object code), script, or any other entity comprising a set of instructions to be performed. When a source program, then the program needs to be translated via a compiler, assembler, interpreter, or the like, which may or may not be included within the memory 310, so as to operate properly in connection with the OS 311. Furthermore, the remapping methods can be written as an object oriented programming language, which has classes of data and methods, or a procedure programming language, which has routines, subroutines, and/or functions.

In exemplary embodiments, a conventional keyboard 350 and mouse 355 can be coupled to the input/output controller 335. Other output devices such as the I/O devices 340, 345 may include input devices, for example but not limited to a printer, a scanner, microphone, and the like. Finally, the I/O devices 340, 345 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 300 can further include a display controller 325 coupled to a display 330. In exemplary embodiments, the system 300 can further include a network interface 360 for coupling to a network 365. The network 365 can be an IP-based network for communication between the computer 301 and any external server, client and the like via a broadband connection. The network 365 transmits and receives data between the computer 301 and external systems. In exemplary embodiments, network 365 can be a managed IP network administered by a service provider. The network 365 may be implemented in a wireless fashion, e.g., using wireless protocols and technologies, such as WiFi, WiMax, etc. The network 365 can also be a packet-switched network such as a local area network, wide area network, metropolitan area network, Internet network, or other similar type of network environment. The network 365 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 301 is a PC, workstation, intelligent device or the like, the software in the memory 310 may further include a basic input output system (BIOS) (omitted for simplicity). The BIOS is a set of essential software routines that initialize and test hardware at startup, start the OS 311, and support the transfer of data among the hardware devices. The BIOS is stored in ROM so that the BIOS can be executed when the computer 301 is activated.

When the computer 301 is in operation, the processor 305 is configured to execute software stored within the memory 310, to communicate data to and from the memory 310, and to generally control operations of the computer 301 pursuant to the software. The remapping methods described herein and the OS 311, in whole or in part, but typically the latter, are read by the processor 305, perhaps buffered within the processor 305, and then executed.

When the systems and methods described herein are implemented in software, as is shown in FIG. 3, the methods can be stored on any computer readable medium, such as storage 320, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In exemplary embodiments, where the remapping methods are implemented in hardware, the remapping methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects include replacement of stateless, secure cryptographic providers with commodity backends of comparable capabilities but finite, non-virtualized keystores. The exemplary systems and methods described herein provide the following capabilities while routing traffic to commodity providers:

1. Allow request bandwidth and apparent backend keystore (key count) capability beyond that of any finite backend;
2. Do not expose sensitive material to the host;
3. Do not need to synchronize the state of one backend to another: backends are implemented as cache of a central, host-based keystore;
4. Implement commodity providers with minimal customization;
5. Transparently support any stateless or handle-based abstract host interface, as long as a sufficiently large opaque token section, or an abstract handle is available. The necessary translation is added to be able to turn the same token/handle into multiple representations, depending on backend;
6. Continue to represent the same object in incompatible providers as an unchanged, single logical stream, even when moved between different physical backends; and
7. Transparently add backends, or recover from the loss of any single backend, similar to fully virtualized stateless providers.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer program product, the computer program product including a non-transitory computer readable storage medium having program instructions for embedding a handle of a module-centric commodity cryptographic service provider within host-opaque region of a host-centric stateless application programming interface embodied therewith, the program instructions executable by a processor to cause:
   receiving the handle by a handle-oriented host library associated with the host-centric application programming interface;
   transforming the handle into a hardware security module readable object by associating the handle with a host-resident key token of the handle-oriented host library to produce a transformed handle by the handle-oriented host library, the host-resident key token comprising host-opaque data, the transformed handle being associated with the host-opaque data;
   selecting, in a stateless host library, a target hardware security module from a plurality of hardware security modules, in accordance with the transforming of the handle and based on object characteristics of the plurality of hardware security modules;
   passing the transformed handle to module-centric stateful modules of the module-centric commodity cryptographic service provider, each module-centric stateful module including a wrapping key accessible by the target hardware security module of the stateless host library;
   dispatching, by the module-centric commodity cryptographic service provider, the transformed handle to a virtualized handle in host token recovery of the stateless host library as a module identifier to a handle database, and to a stateless module having a master key;
   retrieving a virtualized handle in the stateless host library;
   de-serializing a serialized state of the handle in the target hardware security module based on the transforming of the handle into the hardware security module readable object;
   restoring a serialized state of the target hardware security module by passing the handle back to a host token recovery of the stateless host library, wherein the serialized state is restored from the virtualized handle; and
   wherein with respect to dispatching, by the module-centric commodity cryptographic service provider, the transformed handle, the program instructions are further executable by the processor to cause:
      receiving the transformed handle by a commodity service provider dispatch of the module-centric stateful modules of the module-centric commodity cryptographic service provider;
      dispatching the transformed handle by the commodity service provider dispatch to the stateless module.

2. The computer program product of claim 1, wherein the stateless host library includes an object store having several objects.

3. The computer program product of claim 1, wherein the program instructions are further executable by the processor to cause:
   passing the transformed handle as the virtualized handle to a handle database by the stateless host library;
   passing the transformed handle to the module-centric stateful modules, each stateful module including a plurality of control keys, a plurality of data keys, and the wrapping key; and
   passing the transformed handle to the host token recovery of the stateless host library, in preparation for the restoring of the serialized state.

4. A system, comprising a processor and a memory, for embedding a handle of a module-centric commodity cryptographic service provider within a host-opaque region of a host-centric stateless application programming interface, the system being configured to:
   receive the handle by a handle-oriented host library associated with the host-centric application programming interface;
   transform the handle into a hardware security module readable object by associating the handle with a host-resident key token of the handle-oriented host library to produce a transformed handle by the handle-oriented host library, wherein the host-resident key token comprises host-opaque data, wherein the transformed handle is associated with the host-opaque data;
   selecting, in a stateless host library, a target hardware security module from a plurality of hardware security modules, in accordance with the transformation of the handle and based on object characteristics of the plurality of hardware security modules;
   pass the transformed handle to module-centric stateful modules of the module-centric commodity cryptographic service provider, wherein each module-centric stateful module including a wrapping key accessible by the target hardware security module of the stateless host library;
   dispatch, by the module-centric commodity cryptographic service provider, the transformed handle to a virtualized handle in host token recovery of the stateless host library as a module identifier to a handle database, and to a stateless module having a master key;
   retrieve a virtualized handle in the stateless host library;
   de-serialize a serialized state of the handle in the target hardware security module based on the transforming of the handle into the hardware security module readable object;
   restore a serialized state of the target hardware security module by passing the handle back to a host token recovery of the stateless host library, wherein the serialized state is restored from the virtualized handle; and
   with respect to dispatching, by the module-centric commodity cryptographic service provider, the transformed handle, further configured to:
      receive the transformed handle by a commodity service provider dispatch of the module-centric stateful modules of the module-centric commodity cryptographic service provider;
      dispatch the transformed handle by the commodity service provider dispatch to the stateless module.

5. The system of claim 4, wherein the stateless host library includes an object store having several objects.

6. The system of claim 4, further configured to:
   pass the transformed handle as the virtualized handle to a handle database by the stateless host library;
   pass the transformed handle to the module-centric stateful modules, wherein each stateful module includes a plurality of control keys, a plurality of data keys, and the wrapping key; and
   pass the transformed handle to the host token recovery of the stateless host library, in preparation for the restoring of the serialized state.

* * * * *